March. 3,500,054
CONTROLLED UNIFORM ILLUMINATION AND SENSING OF OBJECTS
HAVING DIFFERENTIAL LIGHT REFLECTIVITY
Filed Nov. 27, 1967  2 Sheets-Sheet 1

Michel Marie Joseph Lasalle & Gérard Charles Maurice Jourdan
BY Littlepage & Quantance
Attys

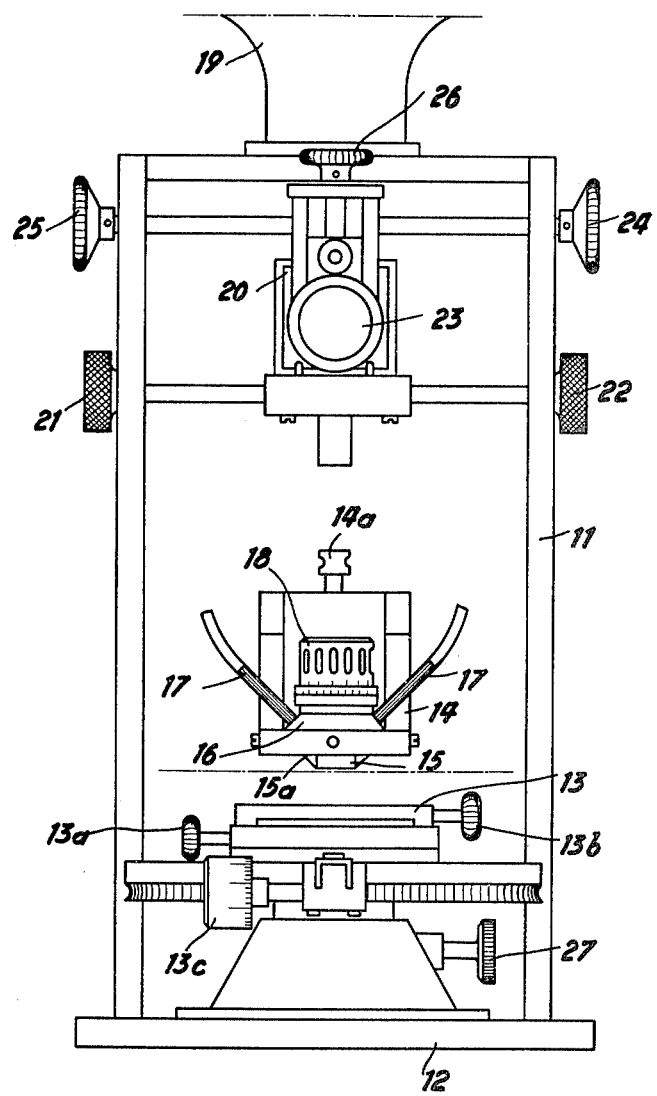

United States Patent Office 3,500,054
Patented Mar. 10, 1970

3,500,054
CONTROLLED UNIFORM ILLUMINATION AND SENSING OF OBJECTS HAVING DIFFERENTIAL LIGHT REFLECTIVITY
Michel Marie Joseph Lasalle, L'Haye-les-Roses, and Gérard Charles Maurice Jourdan, Paris, France, assignors to Societe Anonyme: Societe Alsacienne de Constructions Atomiques de Telecommunications et d'Electronique Alcatel, Paris, France, a corporation of France
Filed Nov. 27, 1967, Ser. No. 685,899
Claims priority, application France, Nov. 25, 1966, 85,079
Int. Cl. H01j 5/16, 39/12; G02b 5/14
U.S. Cl. 250—227
6 Claims

ABSTRACT OF THE DISCLOSURE

The object of the invention consists of a document or image analysis device comprising a light transmitting bundle formed of light conductors constituted by glass fibres or of strands of glass fibres, cooperating with a light receiving bundle, likewise composed of light conductors, so as to form in the immediate proximity of the plane of said document or image to be studied a rigid block of glass fibres or strands of glass fibres perpendicular to the surface of the document or image, the light conductors converging towards said block from a light source, while the receiving conductors diverge from said block towards an equal number of photosensitive cells as there are glass fibres or glass fibre strands, the number of which corresponds to the desired analysis definition.

---

This invention relates to a device for optical analysis of an image.

Numerous image analysis processes exist which establish correspondence between the instantaneous lighting of an elementary portion of the surface of an image and a signal of an electrical nature, which may originate either in the actual support of the image or in a photosensitive cell or group of photosensitive cells. These various processes generally supply an image the faithfulness and accuracy of which depend in particular on the area of the surface element analysed, so that the search for greater fineness of analysis leads to a subdivision of the image into increasingly smaller surface elements; in this direction however a limitation is very soon imposed by insuperable material difficulties.

In particular, when it is required to analyse a document which for example is prepared on a sheet of paper, it is no longer possible to transmit a beam of light perpendicularly to the surface to be studied since it is necessary to place the analysis elements in the immediate proximity of the surface examined. It therefore becomes necessary to use oblique lighting. If the analysis is conducted with sufficiently great precision that the paper grain intervenes, it is found that the incident light will indiscriminately strike against the flanks of the grain of the paper, which are generally not covered with ink, and the apex of the grain which is blackened by the ink. This results in an image in which the contrast between black and white is very slight.

In addition, faithful analysis makes it necessary to use lighting of such power that it is liable to impair the document, however great the sensitivity of the photosensitive cells used.

Finally, it is desired to effect a rapid analysis of the document or a complete analysis of an element of the document, it is necessary to group together a certain number of photosensitive cells in order to analyse simultaneously a larger portion of the document, for example an area of the order of a square centimetre.

Opposite a surface of this size it is possible to assemble only a very small number of cells, because of their dimensions, and the fineness of the analysis is accordingly reduced.

In order to overcome the abovementioned and other difficulties, the applicants have provided a combination of means which makes it possible to effect rapidly an analysis of any document presented in the object plane of the device, with accuracy as great as may be required.

The object of the invention therefore consists of a document or image analysis device comprising a light transmitting bundle formed of light conductors constituted by glass fibres or of strands of glass fibres, cooperating with a light receiving bundle, likewise composed of light conductors, so as to form in the immediate proximity of the plane of said document or image to be studied a rigid block of glass fibres or strands of glass fibres perpendicular to the surface of the document or image, the light conductors converging towards said block from a light source, while the receiving conductors diverge from said block towards an equal number of photosensitive cells as there are glass fibres or glass fibre strands, the number of which corresponds to the desired analysis definition.

In the rigid block the glass fibres or glass fibre strands may be used on the one hand as light conductors for the purpose of illuminating the document or image to be analysed, and on the other hand as receiving conductors.

In the rigid block the glass fibres or glass fibre strands may all be used both as light conductors and as receiving conductors, each fibre serving simultaneously as ray conductor in the forward direction and in the return direction.

The light source is constituted by a lamp the filament of which, being brought to very high temperature, has passed through it a current supplied by a stabilised supply of adjustable intensity, said lamp being protected by a casing provided with an aperture and its rays being concentrated towards said aperture by suitable optical condenser means of any known type cooperating with a filter absorbing infrared rays and allowing the passage of only the spectral part of visible white light corresponding to optimum sensitivity of the receiving photosensitive cells, said filter being placed on the path of the light rays.

The light conductors are assembled in a main transmitter bundle connecting the opening in the casing to the rigid block and spreading out into a plurality of secondary bundles forming a sheet or surrounding said block.

Each glass fibre, whether stranded or not, may have a diameter between a fraction of a micron and several hundred microns.

It is understood that fibres of very small diameter are used only when very fine analysis is desired and that fibres of larger diameter will be used whenever possible.

The opening in the casing has a circular shape or the shape of a slot, depending on whether the secondary bundle surround the rigid block or are disposed in a sheet near the latter.

In an embodiment which is mentioned by way of example without limitation, the rigid block is composed of glass fibres or glass fibre strands of short length which are rigidly welded together and form a honeycomb, in which the incident light and the light retransmitted by the document studied have a common path and in which the two faces perpendicular to the conductors are optically polished, the portion of document analysed being applied against one of said faces, while the incident light penetrates through the other face from light conductors originating from the light source, said conductors being interrupted a short distance from said face of the honeycomb block and being disposed circularly around said face, in relation to which the conductors are inclined substantially at 45°.

The light coming from the conductors is refracted on the polished, anti-reflection coated edge of the honeycomb, and is then channeled by the conductor fibres and illuminates the document, producing much more pronounced contrast than would be obtained by direct illumination of the document by conventional optical methods, because of very favourable incidence. The beam forming a honeycomb transports the image of the document thus obtained into the object plane on the second polished face, each fibre of the honeycomb thus playing a dual role as transmitting fibre and receiving fibre.

It is thus seen that, according to an essential characteristic of the invention, the honeycomb simultaneously forms part of the light transmitter block and of the observation and analysis receiver assembly.

Still as part of this embodiment, the analysis receiver comprises at the outlet of the honeycomb an optical system provided with a focussing and adjusting device intended to transport the image of the document obtained on the top face of the honeycomb towards the optically polished inlet face of a bundle of receiver conductors leading to the photosensitive cells, said bundle of receiver conductors being formed by rigid or flexible light conductors constituted by assemblies of glass fibres spreading out into a multitude of conductors, the number of which is made equal to the desired number of photosensitive cells.

When each receiver conductor is composed of a large number of fibres, the applicants preferably use fibres of large diameter (of the order of 100 microns and over). On the other hand, whenever it is necessary to effect extremely fine analysis of the image, it is possible to analyse separately the light coming from each fibre, by associating it with a photosensitive cell which makes it possible to define the corresponding state of the document studied on an elementary surface equal to or smaller than a square the sides of which measure 1 micron.

The photosensitive cells used by the applicants are preferably elements having a sensitive surface not exceeding the dimensions of a pinhead. The optical connection between the sensitive surface of the cell and the light receiver conductor is made by means of a cover isolating said surface from the surrounding medium and centering the conductor on the centre of the cell.

In a variant, the transmitter bundle coming from an opening formed in the casing of the light source is subdivided near the plane of the document to be analysed into a congruence of separate fibres, for example of 10 microns in diameter, all of which are parallel to one another and perpendicular to the plane of the document to be analysed, and the light receiver conductors, which are for example formed of strands of fibres of 10 microns, each capped by a photosensitive cell, are likewise divided near the document to be analysed into an orderly assembly of separate fibres, all parallel to one another and perpendicular to the plane of the document to be analysed; all the transmitter and receiver fibres are juxtaposed rigid so as to form a block of rectangular section for example, in such a manner that along each main direction of the section there are alternately placed a transmitter fibre and then a receiver fibre, the receiver fibres being arranged so that the fibres coming from the same strand analyse the same surface element, while the block thus formed is polished optically on its bottom face.

In a second variant, the transmitter bundle and the receiver bundle are rigidly welded together over part of their length, as in the previous variant, but the light transmitting fibres are of a larger diameter than the receiving fibres, so that the fibres of each elementary receiving strand surround, near the document, a single conductor of the transmitter bundle, each light transmitting conductor therefore correponding to only one receiving strand and only one receiving cell, and the face of the rigid block facing the document being optically polished.

In the two variants mentioned above, a mechanical device for very fine adjustment makes it possible to adjust the distance between the document and the polished face of the rigid block, so as to obtain the maximum signal on the cells.

The invention is described in greater detail hereinbelow with reference to the accompanying drawings, in which:

FIGURE 3 illustrates diagrammatically a material embodiment of this form of construction.

FIGURE 1 illustrates the principle of the form of construction of the device, in which the incident light and the light retransmitted by the document studied have in part a common path.

Figure 1:
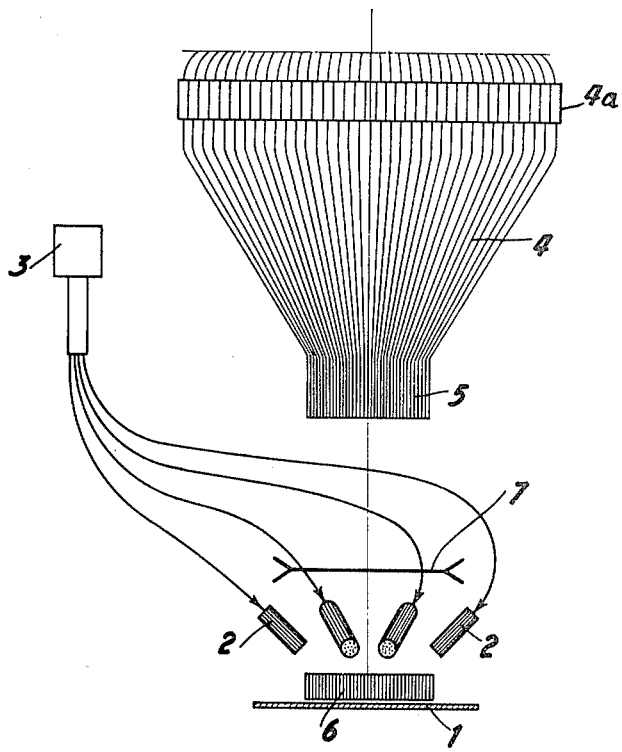
FIGURE 1 illustrates diagrammatically the principle of a form of construction of the device forming the object of the invention.

The document 1 is illuminated by light conductors constituted by bundles 2 of glass fibres or glass fibre strands which are disposed above said document and extend to a light source 3.

The analyser assembly is composed of a bundle 4 of glass fibres or glass fibre strands welded together at the bottom of the bundle so as to form a block 5 of which the bottom face, composed of the ends of the glass fibres, is optically polished.

Between the document 1 and the block 5 there is placed, in alignment with the latter, a rigid block 6 constituted by glass fibres or glass fibre strands of short length and parallel to one another, which are welded together to form a honeycomb of which the two faces perpendicular to the fibres or strands constituting light conductors are dressed and optically polished, the top face being given anti-reflection treatment while the face placed in contact with the document is hardened.

The bundles 2 of light conductors coming from the light source 3 are interrupted at a short distance from the top face of the rigid block 6 and are inclined substantially at 45° in relation to said face.

The portion of the document 1 to be analysed is applied against the bottom face of the rigid block 6 and the incident light supplied by the bundles 2 is refracted on the top face and channeled by the conducting fibres. The document is then illuminated and the fibres of the block 6 transmit the image of the document thus obtained to the object plane on the top face, each of said fibres thus playing the double role of transmitter fibre and receiver fibre.

The image formed on the top face of the block 6 is received by the block 5, of which the fibres, acting only as receiving fibres, transmit to the photosensitive cells 4a the more or less intense light rays transmitted by the block 6.

Said rays may be transmitted directly from the block 6 to the block 5 by bringing the two blocks as close together as is permitted by the light transmitter bundles 2.

Transmission may also be effected through an objective 7 placed between the two blocks.

Figure 2:
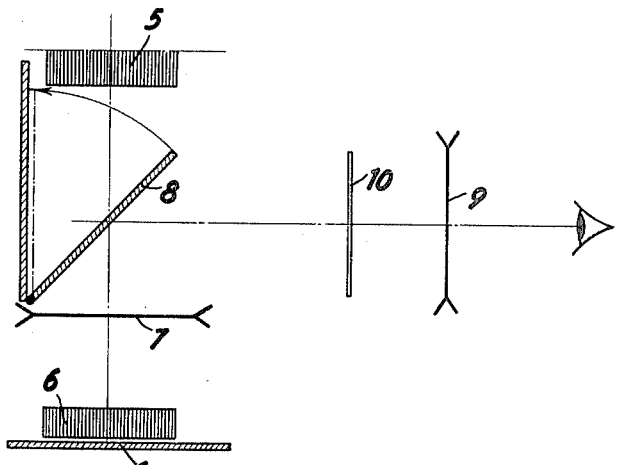
FIGURE 2 illustrates diagrammatically a system of optical control of the adjustment of the device.

The objective may be focussed under the control of a sighting system composed of a retractable mirror 8 (FIGURE 2) and an eyepiece 9. A graticule sight 10 may be inserted in the sighting system in order to facilitate the bringing into coincidence of the fibres of the two blocks.

FIGURE 3 illustrates diagrammatically an example of practical construction of the analysis device of the type described above, in which the incident light and the light transmitted by the document 1 studied have in part a common path.

In this device, a frame 11 containing the optical equipment proper rests on a base 12 on which is mounted an object carrier stage 13, such as for example a microscope stage, of which the various adjustments 13a, 13b, and 13c permit respectively the longitudinal, transversal, and angular positioning of the document to be analysed.

In the frame 11 a carriage 14 adapted to slide vertically under the action of a screw 14a has at the bottom, opposite the object carrier stage 13, a honeycomb pressure block 15 protected by a cover 15a and constituted by glass fibres rigidly assembled together perpendicularly to the plane of the stage 13, the two faces of the honeycomb block being carefully polished.

Above the honeycomb block 15 there are mounted, in a truncated conical base 16, four flexible light conductors 17 of glass fibres, which are inclined at 45° to the plane of the honeycomb block and receive light from a source (not illustrated) the intensity of which is adjustable and which is constituted by a high brilliancy tube associated with a focussing optical system and a filter absorbing infrared radiation.

An objective 18 centred on the vertical axis of the assembly and provided with focussing means is likewise mounted on the carriage 14 above the truncated conical base 16.

On the top of the frame 11 there is mounted a bundle 19 of 225 rigid conductors, composed of glass fibres assembled in strands of a square section, the sides of which measure 1 mm., while the ends of said fibres facing the objective are grouped into an optically polished square of a side length of 15 mm.

These 225 light conductors, which are intended to receive the image of the portion of document, studied through the medium of the honeycomb 15 and the objective 18, then spread out into a volume of pyramidal shape, each of them leading to a photosensitive diode (not illustrated).

A retractable device for adjusting the image formed by the objective 18 is disposed between the latter and the polished face of the 225 conductors on an axis perpendicular to the axis of the system.

This device comprises a retractable mirror 20 controlled from outside the frame by knurled knobs 21 and 22, a graticule 23 carrying a grid representing the arrangement of the inlet end face of the 225 conductors, and a sighting device (not illustrated).

The graticule is adapted to be moved transversely by means of knurled screws 24 and 25, and vertically by means of the knurled screw 26.

An adjusting photodiode (not illustrated), enabling the luminous intensity of the source to be controlled, is disposed above the honeycomb pressure block 15.

The device functions in the following manner:

The document to be studied having been fixed on the stage 13, the carriage 14 is moved so that the bottom face of the honeycomb pressure block 15 comes into contact with the portion of document which it is desired to study.

The light source is then operated and permits illumination of the top face of the honeycomb pressure block 15 by means of the light conductors 17. The light coming from the conductors 17, refracted on the top face of the honeycomb 15 and channeled by the conductor fibres of which the latter is composed, illuminates the documents under very favourable angles of incidence, thus producing much more pronounced contrast than would be obtained by direct lighting. The image of the portion of document thus obtained in the object plane is transmitted by the honeycomb 15 to its top face, each fibre of the honeycomb thus serving the dual role of transmitting fibre and receiving fibre.

The image obtained on the top face of the honeycomb 15 is transmitted by the objective 18 to the input face of the bundle 19 of 225 light conductors, then being distributed in the form of elements and directed towards photosensitive diodes.

In order to make sure that the image formed on the top face of the honeycomb is transmitted under good conditions to the input face of the bundle 19, said image is previously centred by adjusting the objective 18.

Observation of the adjustment is made possible by inclining the retractable mirror 20, which transmits the image formed by the objective 18 to the sighting apparatus provided with the graticule 23 carrying a grid representing the arrangement of the 225 conductors of the bundle of conductors 19.

A mechanical system controlled by a knurled knob 27 enables the stage to be locked after adjustment of its height and centring by means of the knobs 13a, 13b, and 13c.

As has been previously stated, ends of separate transmitting and receiving fibres may be intermingled parallel to each other and may be juxtaposed at their ends in a rigid manner in order to form a rectangular block, for example. Along each main transverse direction of the block perpendicular to the fibre orientation, transmitting fibres are alternated with receiving fibres forming a honeycomb-like interrelationship. Above the block of juxtaposed ends the receiving fibres are arranged in strands in such a manner that the fibres from one strand occupy a single area in the block and analyze a contingent surface elemental area. In this embodiment, as in all other embodiments, fibres may designate individual fibres or collective groups of fibres in strands.

In this case, the adjustment consists of adjusting the distance between the document and the bottom optically polished face of the block of fibres in order to obtain the maximum signal on the cells.

It is also possible to give the light transmitting fibres a larger diameter than that of the receiving fibres, so that the fibres composing each elementary receiving strand may surround, near the document to be analysed, a single conductor of the transmitting bundle, each light transmitting conductor thus corresponding only to a single receiving strand and a single receiving cell.

In this case, as in the previous case, the adjustment of the distance between the document and the bottom optically polished face of the block of fibres is the only adjustment required and may be effected by means of any known mechanical device capable of effecting very fine adjustment.

It is obvious that modifications of form and detail may be made to the analysis device described above by way of simple example without limitation, without thereby departing from the spirit of the invention.

What is claimed is:

1. A device for optical analysis of a document surface, comprising:
    a rigid block of parallel light conductors having first and second parallel faces perpendicular to the conductors, the first face being disposed near the surface,
    a light source spaced from the block,
    a separate light transmitting bundle means of light conductors having first ends adjacent the light source and second ends adjacent the second face,
    light receiving bundle means composed of light conductors having first ends near the second face and having second ends terminating in photosensitive cell means spaced from the block, whereby the light transmitting bundle means converge toward said block from the light source, while the light receiving bundle means diverge from the block towards the photosensitive cell means having a number of individual cells equal to a number of light conductors in the light receiving bundle means.

2. A device according to claim 1 wherein within the rigid block some light conductors are used for illuminating the surface by conducting light from the second face to the first face and other light conductors are used for conducting light from the first face to the second face.

3. A device according to claim 1 wherein in the rigid block the light conductors are all used both as light transmitting conductors and as light receiving conductors for transmitting light both from the second to the first face and from the first to the second face.

4. The device according to claim 1 wherein the light transmitting bundle means comprises a main transmitter bundle connected to an opening in a casing of the light source and spreads out into a plurality of secondary transmitter bundles which terminate near the rigid block.

5. The device according to claim 1 wherein faces of the rigid block are optically polished and wherein the light transmitting bundle means comprises a plurality of transmitter bundles disposed around the second face and inclined thereto at substantially 45 degrees.

6. Device according to claim 5 wherein the first ends of light conductors in the light receiving bundle means define an optically polished flat face parallel to the second face of the rigid block and further comprising an optical system provided with a focusing and adjusting device interposed between the flat face of the receiving bundle and the second face of the rigid block.

References Cited
UNITED STATES PATENTS

| | | | |
|---|---|---|---|
| 3,038,959 | 6/1962 | Beurle | 350—96 X |
| 3,043,910 | 7/1962 | Hicks | 350—96 X |
| 3,125,013 | 3/1964 | Herrick et al. | 350—96 X |
| 3,235,660 | 2/1966 | Treseder et al. | |
| 3,247,755 | 4/1966 | Siegmund | 350—96 |
| 3,278,739 | 10/1966 | Royka et al. | 350—96 X |

JAMES W. LAWRENCE, Primary Examiner

DAVID O'REILLY, Assistant Examiner

U.S. Cl. X.R.

350—96